US006397215B1

(12) United States Patent
Kreulen et al.

(10) Patent No.: US 6,397,215 B1
(45) Date of Patent: May 28, 2002

(54) METHOD AND SYSTEM FOR AUTOMATIC COMPARISON OF TEXT CLASSIFICATIONS

(75) Inventors: Jeffrey Thomas Kreulen, San Jose; William Scott Spangler, San Martin; Hovey Raymond Strong, Jr., San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,651

(22) Filed: Oct. 29, 1999

(51) Int. Cl.[7] .............................................. G06F 17/30
(52) U.S. Cl. ................................................ 707/7; 707/6
(58) Field of Search ............................. 707/7, 1, 6, 2, 707/3, 5, 104; 382/225, 226, 227

(56) References Cited

U.S. PATENT DOCUMENTS

| | | | |
|---|---|---|---|
| 5,463,773 A | 10/1995 | Sakakibara et al. | 707/102 |
| 5,832,470 A | 11/1998 | Morita et al. | 707/1 |
| 5,857,179 A | 1/1999 | Vaithyanathan et al. | 707/2 |
| 6,128,613 A | * 10/2000 | Wong et al. | 707/7 |
| 6,137,911 A | * 10/2000 | Zhilyaev | 382/225 |
| 6,185,550 B1 | * 2/2001 | Snow et al. | 707/1 |

* cited by examiner

Primary Examiner—Sanjiv Shah
(74) Attorney, Agent, or Firm—Morgan & Finnegan, LLP; Khanh Q. Tran (57) ABSTRACT

A system and method for automatic generation of a comparison list given two different classifications, and automatic sorting of the list in order of similarity. A first dictionary is generated including a subset of words contained in a first document set, the first document set including at least one document and having an associated first classification including at least one class, each class having a class name. A second dictionary is generated including a subset of words contained in a second document set, the second document set including at least one document and having an associated second classification including at least one class, each class having a class name. A common dictionary including words that are common to both the first dictionary and the second dictionary is generated. A count of occurrences of each word in the common dictionary within each document in each document set is generated. A centroid of each class in the space of the common dictionary is generated. A nearest centroid in the second classification for each centroid in the first classification is determined. A list is generated including class names of each class in the first classification and a class name of a corresponding nearest class in the second classification and the class names in the first classification are sorted based on a distance from a nearest centroid in the second classification.

15 Claims, 8 Drawing Sheets

```
int best;
int matchingClusters[];

public float[] computeAllDiffs() {
 matchingClusters = new int[numClasses];
 float result[] = new float[numClasses];
 for (int i=0; i<result.length; i++) {
  result[i] = computeNearestDistance(i);
  matchingClusters[i] = best;
 }
return(result);
} public float computeNearestDistance(int c) {
 float bestdistance = Float.MAX_VALUE;
 for (int i=0; i<tcl.nclusters; i++) {
  float value = d(classificationl.centroids[i],classification2.centroids[c]);
  if (value<bestdistance) {
   bestdistance=value;
   best = i;
  }
 }
return(bestdistance);
}
```

Fig. 7

520 space,issues,increased ←→ MSE4O
rpr,issue ←→ OTHERSOFTW
installed ←→ IMAC
win95 ←→ FILEMGR
monitor,procurement ←→ MONITOR
queue,line ←→ INFO
phone,list ←→ IS_REQUEST
narf,received ←→ NARF
error,reboot ←→ SYSTEM
schedule,opened ←→ MS SCHED+
network ←→ WIN-NT
machine,virus ←→ VIRUS
quote, project ←→ HARDWARE
server ←→ SERVER
migrated,word,icon,told,added ←→ ICON
password ←→ PASSWORD
desk,status stated help ←→ PCSOFTWARE
support,subject ←→ LAN
hung,wrong ←→ EXOHANOREM
file ←→ RESTORE
decommission,transferred,compaq ←→ ASSET_DECOM
apr ←→ LOCKOUT
personnel,speak,service ←→ PWSUPP
print ←→ PRINTING
win31 ←→ WIN31
account ←→ IS_REQUEST
internet ←→ INTERNET
work,moving ←→ REPORTS
mail,address ←→ MSE40
coord ←→ BREAKFIX
exchange ←→ MSE40
laptop ←→ LAPTOP
working,system,fine,omni ←→ BREAKFIX
drive ←→ HURRICANE

| Class Name | Size | Cohesion | Distinctness | Difference |
|---|---|---|---|---|
| hung,wrong | 110 | 329 | 44 | 276 |
| queue,line | 119 | 309 | 277 | 275 |
| win31 | 388 | 418 | 290 | 273 |
| work,moving | 127 | 237 | 207 | 273 |
| apr | 61 | 329 | 211 | 271 |
| personnel,speak,s... | 119 | 260 | 313 | 269 |
| error,reboot | 273 | 234 | 134 | 228 |
| migrated,word,ico... | 181 | 151 | 254 | 218 |
| space,issues,incr... | 425 | 216 | 196 | 216 |
| drive | 413 | 316 | 196 | 214 |
| working,system,fin... | 299 | 215 | 110 | 213 |
| internet | 247 | 407 | 150 | 211 |
| mail,address | 231 | 219 | 86 | 209 |
| win95 | 1134 | 421 | 114 | 203 |
| machine,virus | 289 | 233 | 119 | 201 |
| phone,list | 205 | 254 | 204 | 199 |
| desk,status,stated... | 196 | 233 | 260 | 188 |
| coord | 364 | 278 | 7 | 174 |
| file | 442 | 303 | 109 | 171 |
| rpr,issue | 461 | 239 | 0 | 166 |
| network | 357 | 256 | 134 | 150 |
| installed | 320 | 256 | 55 | 138 |
| account | 519 | 356 | 64 | 119 |
| laptop | 227 | 263 | 136 | 119 |
| exchange | 406 | 293 | 64 | 117 |
| support,subject | 326 | 247 | 0 | 105 |
| quote,project | 749 | 332 | 213 | 100 |
| access | 361 | 295 | 140 | 100 |
| server | 224 | 251 | 44 | 98 |
| schedule,opened | 162 | 207 | 109 | 80 |
| monitor,procurem... | 148 | 300 | 196 | 65 |
| password | 1139 | 363 | 226 | 48 |
| decommission,tra... | 151 | 249 | 196 | 45 |
| narf,received | 159 | 357 | 122 | 4 |

METHOD AND SYSTEM FOR AUTOMATIC COMPARISON OF TEXT CLASSIFICATIONS

FIELD OF THE INVENTION

The present invention relates to a system and method for automatic generation of a comparison list given two different classifications.

BACKGROUND OF THE INVENTION

Document classification, or grouping of documents, provides a means for a reader to quickly locate a set of similar documents that are most relevant to the reader's needs. In the past, such classifications were generated manually by a human expert or automatically via a computer program that compares the text of different documents based on frequency of word occurrence. Examples of electronic document classifications include folders of email messages, categorizations of help desk problem tickets, and logical groupings of research abstracts by subject.

A problem arises when comparing two different classifications in a domain of similar or identical documents. Different classifications may arise either because of a change in the method for generating a classification (e.g. human expert vs. automatic) or because the underlying set of documents being classified has changed (e.g. additional documents being authored over time). A comparison consists of a list in which each of the classes contained in one classification is matched with the single most similar class in a second classification. Past approaches to this problem have focussed primarily on comparing classifications on the same document set where the primary goal has been to find out which classification was better or more complete. A need arises for a technique which will provide automatic generation of such a list given two different classifications, and automatic sorting of the list in order of similarity.

SUMMARY OF THE INVENTION

The present invention is a system and method for automatic generation of a comparison list given two different classifications, and automatic sorting of the list in order of similarity. The two classifications may be over the same set of documents or two different (but somewhat similar) sets of documents. The approach of this invention is more flexible than past approaches, since it can apply to classifications on different document sets. The present invention does not discover which classification is "better", but rather discovers the key similarities and differences between classifications.

In order to perform the method of the present invention, a first dictionary is generated including a subset of words contained in a first document set, the first document set including at least one document and having an associated first classification including at least one class, each class having a class name. A second dictionary is generated including a subset of words contained in a second document set, the second document set including at least one document and having an associated second classification including at least one class, each class having a class name. A common dictionary including words that are common to both the first dictionary and the second dictionary is generated. A count of occurrences of each word in the common dictionary within each document in each document set is generated. A centroid of each class in the space of the common dictionary is generated. A nearest centroid in the second classification for each centroid in the first classification is determined. A list is generated including class names of each class in the first classification and a class name of a corresponding nearest class in the second classification and the class names in the first classification are sorted based on a distance from a nearest centroid in the second classification.

According to one aspect of the present invention, the count of occurrences is generated by generating a matrix having rows and columns, each column corresponding to a word in the common dictionary, each column corresponding to a document, and each entry representing a number of occurrences of the corresponding word in the corresponding document.

According to another aspect of the present invention, the centroid of each class is generated by generating a vector having a plurality of entries, each entry corresponding to a word in the common dictionary and having a value equal to an average of the values of the entries in the matrix corresponding to the word in the common dictionary.

According to another aspect of the present invention, the nearest centroid in the second classification for each centroid in the first classification is determined by, for each centroid in the first classification, determining a distance between the centroid in the first classification and each centroid in the second classification; and selecting a centroid in the second classification having a least distance from the centroid in the first classification.

According to another aspect of the present invention, the distance between centroids is determined using a distance function of:

$$d(X, Y) = -\frac{X \cdot Y}{\|X\| \cdot \|Y\|},$$

wherein X is the centroid in the first classification, Y is the centroid in the second classification, and d(X,Y) is the distance between the centroid in the first classification and centroid in the second classification.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
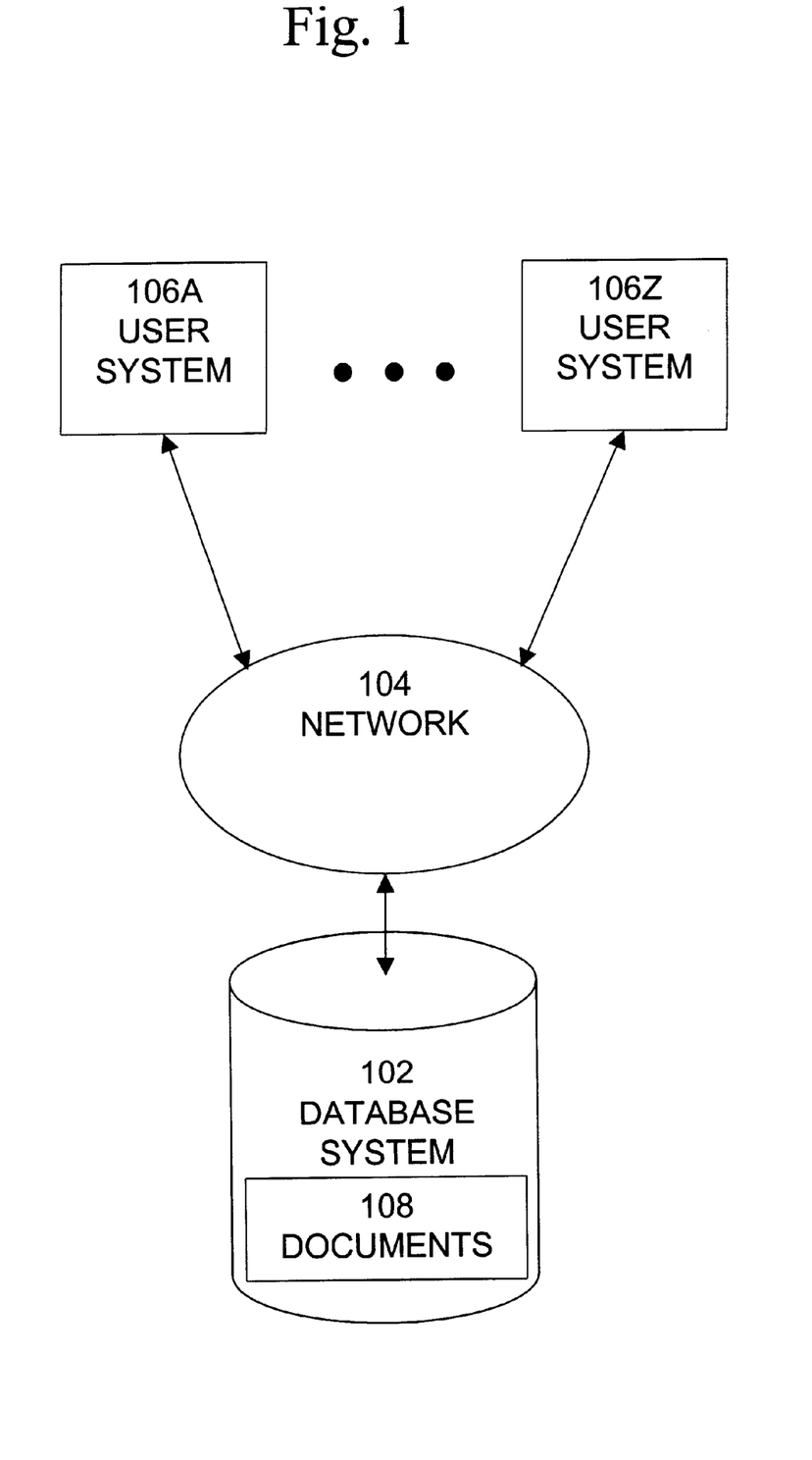
FIG. 1 is an exemplary block diagram of a networked database system in which the present invention may be implemented.

An exemplary networked database system is shown in FIG. 1. The system includes database system 102, network 104, and a plurality of user systems 106A–Z. The user systems 106A–Z are communicatively connected to database system 102 by network 104. The user systems 106A–Z may obtain data from database system 102 by transmitting queries to database system 102, which performs the query by accessing data that satisfies the query, and transmits the data to the requesting user system. Many types of data may be stored in database system 102, but the present invention is concerned with data in the form of documents 108 that contain textual information, such as email messages, categorizations of help desk problem tickets, and logical groupings of research abstracts by subject.

Figure 2:
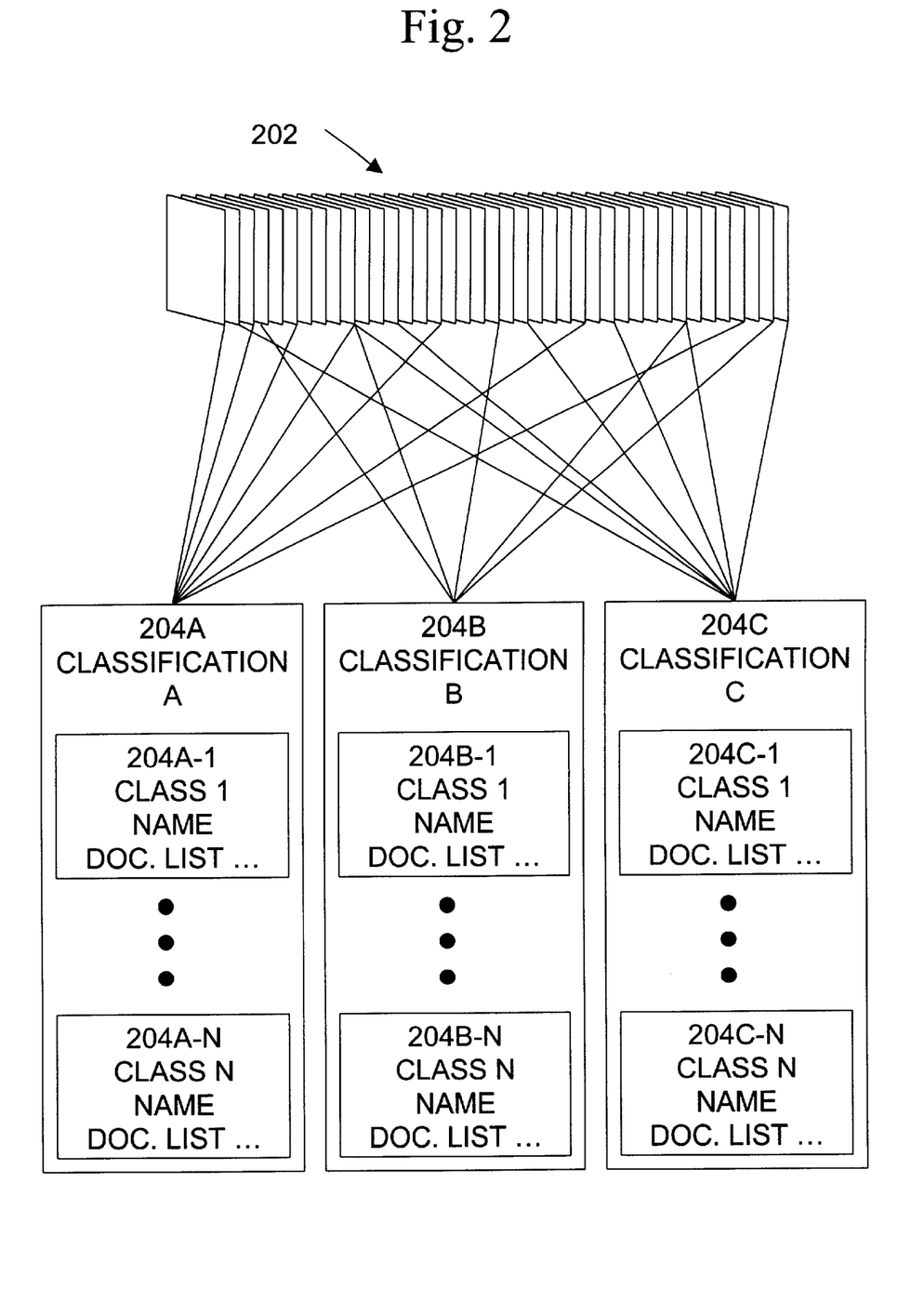
FIG. 2 is an exemplary block diagram of a document classification scheme used in the present invention.

Documents that are relevant to a particular point may be located by a variety of methods. One common technique is document classification, as shown in FIG. 2. Documents 202 are grouped into a plurality of classifications, such as classifications 204A–C, according to particular criteria, such as the frequency of occurrence of words in the documents. Such classifications may be generated manually by a human expert or automatically via a computer program. Each classification may contain one or more classes, such as classes 204A-1-204A-N, 204B-1-204B-N and 204C-1-204C-N. For the purposes of the present invention class in a classification is defined accurately by enumeration or listing of the set of documents the class contains. A class will also be described generally be a short phrase or set of words that are most indicative of the set of documents that class comprises. This phrase or set of words is termed a class name.

The present invention compares two different classifications in a domain of similar or identical documents. Different classifications may arise either because of a change in the method for generating a classification (e.g. human expert vs. automatic) or because the underlying set of documents being classified has changed (e.g. additional documents being authored over time). The result of a comparison is a list, in which each of the classes contained in one classification is matched with the single most similar class in a second classification.

The present invention is a system and method for automatic generation of a comparison list given two different classifications, and automatic sorting of the list in order of similarity. The two classifications may be over the same set of documents or two different (but somewhat similar) sets of documents. The approach of this invention is more flexible than past approaches, since it can apply to classifications on different document sets. The present invention does not discover which classification is "better", but rather discovers the key similarities and differences between classifications.

The comparison of two different document classifications is valuable because it quickly locates the substantial differences that exists between two classifications, or between two document collections. In the first case, such differences may help to identify weaknesses in one or both classifications (e.g. meaningful classes that were not identified). In the second case such differences may show which documents are most unique to one document set when compared to another. For example in the case of help desk problem tickets we may discover a new type of problem occurring over time that indicates a potential new problem with product.

Figure 3:
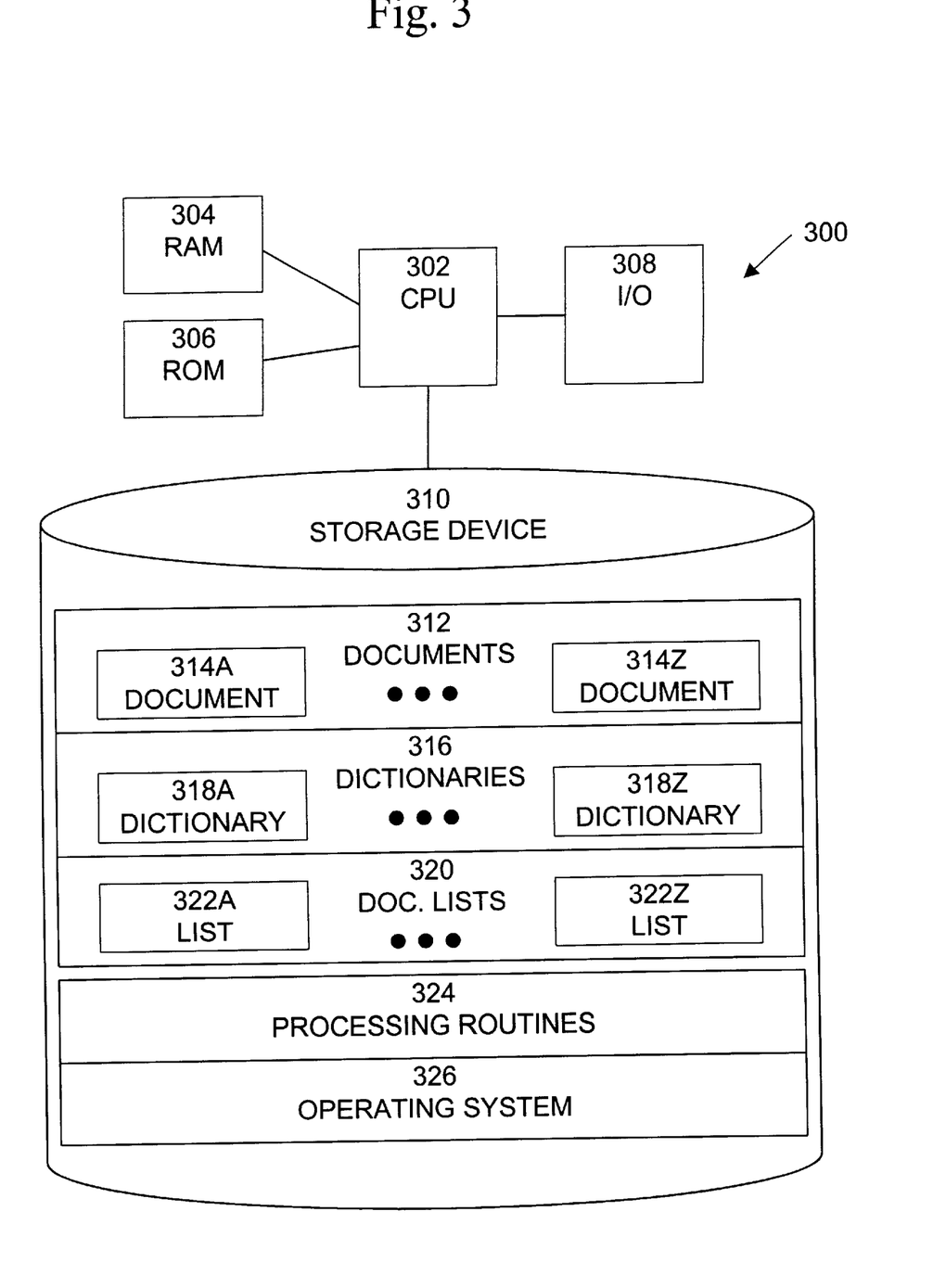
FIG. 3 is an exemplary block diagram of a computer system in which the present invention may be implemented.

An exemplary system 300 in which the present invention is implemented is shown in FIG. 3. System 300 includes central processing unit (CPU) 302, which is connected to random access memory (RAM) 304, read-only memory (ROM) 306, input/output devices (I/O) 308 and storage device 310. CPU 302 may comprise a microprocessor, for example, an INTEL PENTIUM processor, or CPU 302 may comprise a mini-computer or mainframe processor. RAM 304 and ROM 306 store program instructions that are executed by CPU 302 and data that is used during program execution. I/O devices 308 may include any devices used to input data to system 300, such as a keyboard, mouse, trackpad, trackball and graphics tablet, to output data from system 300, such as a display and a printer, and to both input and output data, such as a modem and a network adapter. Storage device 310, which stores data that is used by the present invention, may comprise, for example, random-access memory, a magnetic disk and/or optical disk and may also comprise a magnetic tape.

Storage device 310 includes documents storage 312, which includes one or more documents 314A–Z. Each document is typically stored as one or more files. Each document typically contains at least some text, but may also contain other types of information, such as numeric data, graphics, images, audio, or video. Dictionary storage 316 includes one or more dictionaries 318A–Z. Each dictionary is associated with a set of documents and includes a subset of the words contained in each set. A set of documents may include as few as one document, or a set of documents may include as many as all the documents in document storage 312. Document lists storage 320 includes one or more lists of documents 322A–Z. Each document list contains an indication of each document that meets specified criteria used by the present invention.

Figure 4:
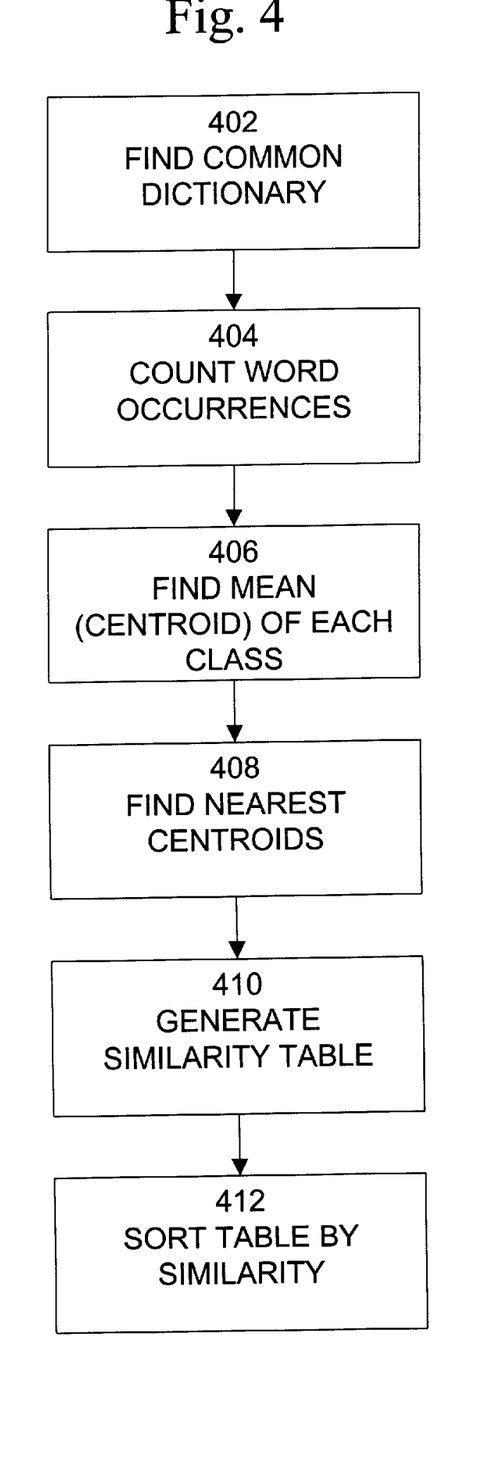
FIG. 4 is an exemplary flow diagram of a process of operation of the present invention.

Storage device 310 includes processing routines 324 include program software routines that are executed by CPU 302 and which implement the processes of the present invention, as described in FIG. 4. Processing routines 324 are preferably written in a high-level programming language, such as the JAVA programming language. If written in JAVA, processing routines 324 run on top of the JAVA virtual machine (not shown). Storage device 310 also includes operating system 326.

Figure 5:
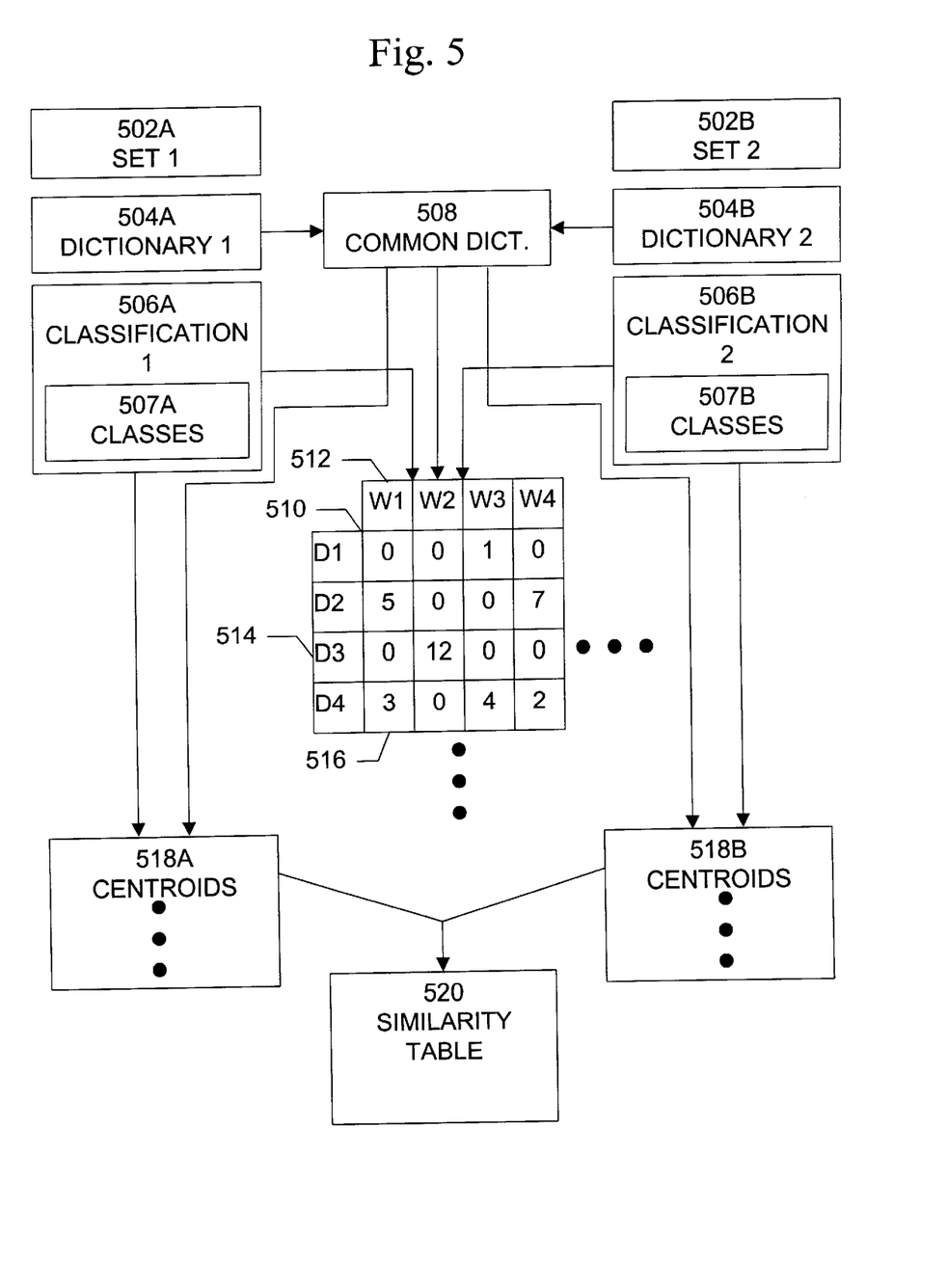
FIG. 5 is an exemplary data flow diagram showing the processing performed by the process shown in FIG. 4.

A process of operation of the present invention is shown in FIG. 4. FIG. 4 is best viewed in conjunction with FIG. 5, which is a data flow diagram showing the processing of information in the present invention. As shown in FIG. 5, there are two sets of documents 502A and 502B, a dictionary 504A listing a subset of the words contained in set 502A, a dictionary 504B listing a subset of the words contained in set 502B, a classification 506A of document set 502A, and a classification 506B of document set 502B. Classification 506A includes one or more classes 507A and classification 506B includes one or more classes 507B.

In step 402 of FIG. 4, a common dictionary, shown as block 508 in FIG. 5, is found for both document sets 502A and 502B. The dictionaries 504A and 504B are compared and the set of words that are common to both are collected into a single common dictionary 508.

In step 404 of FIG. 4, occurrences of words in common dictionary 508 are counted. The result of the counting step is shown in FIG. 5 as matrix 510. Matrix 510 is only an example of the storage of the results of the counting step, one of skill in the art would recognize that other techniques may be used instead. To continue with the example, in matrix 510, each column, such as column 512, corresponds to a word in the common dictionary and each row, such as row 514, corresponds to a document. Each entry, such as entry 516, in matrix 510 represents the number of times each dictionary word occurs in each document. Since most of these entries will, under normal circumstances, have a value of zero, the matrix is termed "sparse". This property of sparseness may be used by a compression scheme to greatly decrease the amount of storage required to hold the matrix in memory, while incurring only a small cost in retrieval speed.

In step 406 of FIG. 4, the mean or centroid of each class is found for each classification. Thus, a set of centroids 518A is generated based on the classes 507A in classification 507B and a set of centroids 518B is generated based on the classes 507B in classification 506B. The centroid of each class is a vector having the same length as the number of words in the common dictionary. The value of each entry in the vector is the average value of that entry for all the examples in the class. The centroid is therefore just the mean of the class of documents.

Figure 6:
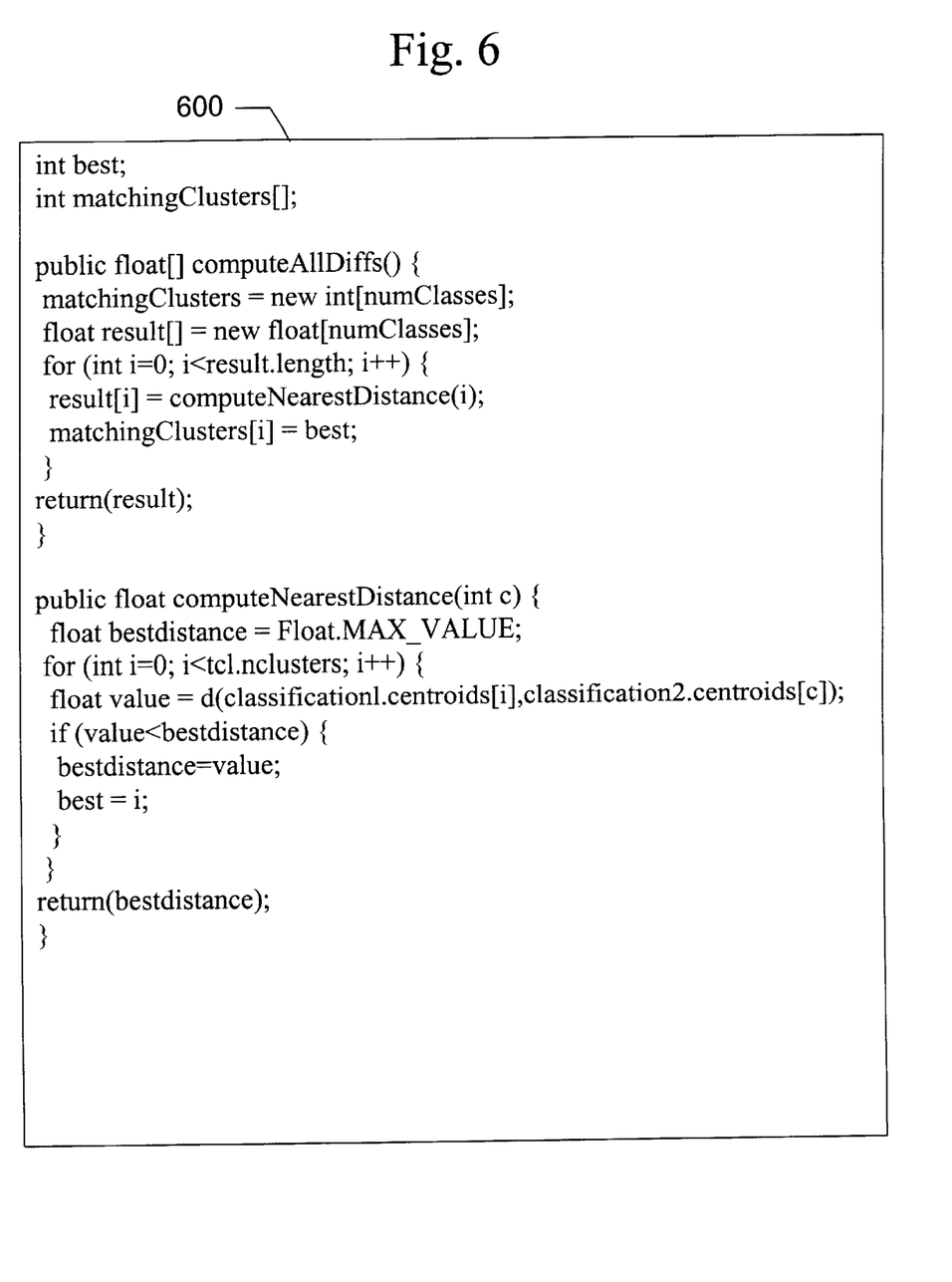
FIG. 6 is an exemplary code listing of a code fragment that implements one step in the process shown in FIG. 4.

In step 408, for each centroid in the first classification, the nearest centroid in the second classification is found using an appropriate distance metric. For example, for each centroid in the first classification, a distance between the centroid in the first classification and each centroid in the second classification may be determined and the centroid in the second classification having a least distance from the centroid in the first classification may be selected. An exemplary code fragment 600 implementing a method for doing this is shown in FIG. 6.

The distance function (d) is implemented to reflect the following measure of centroid similarity (referred to as cosine similarity):

$$d(X, Y) = -\frac{X \cdot Y}{\|X\| \cdot \|Y\|}$$

Figure 7:
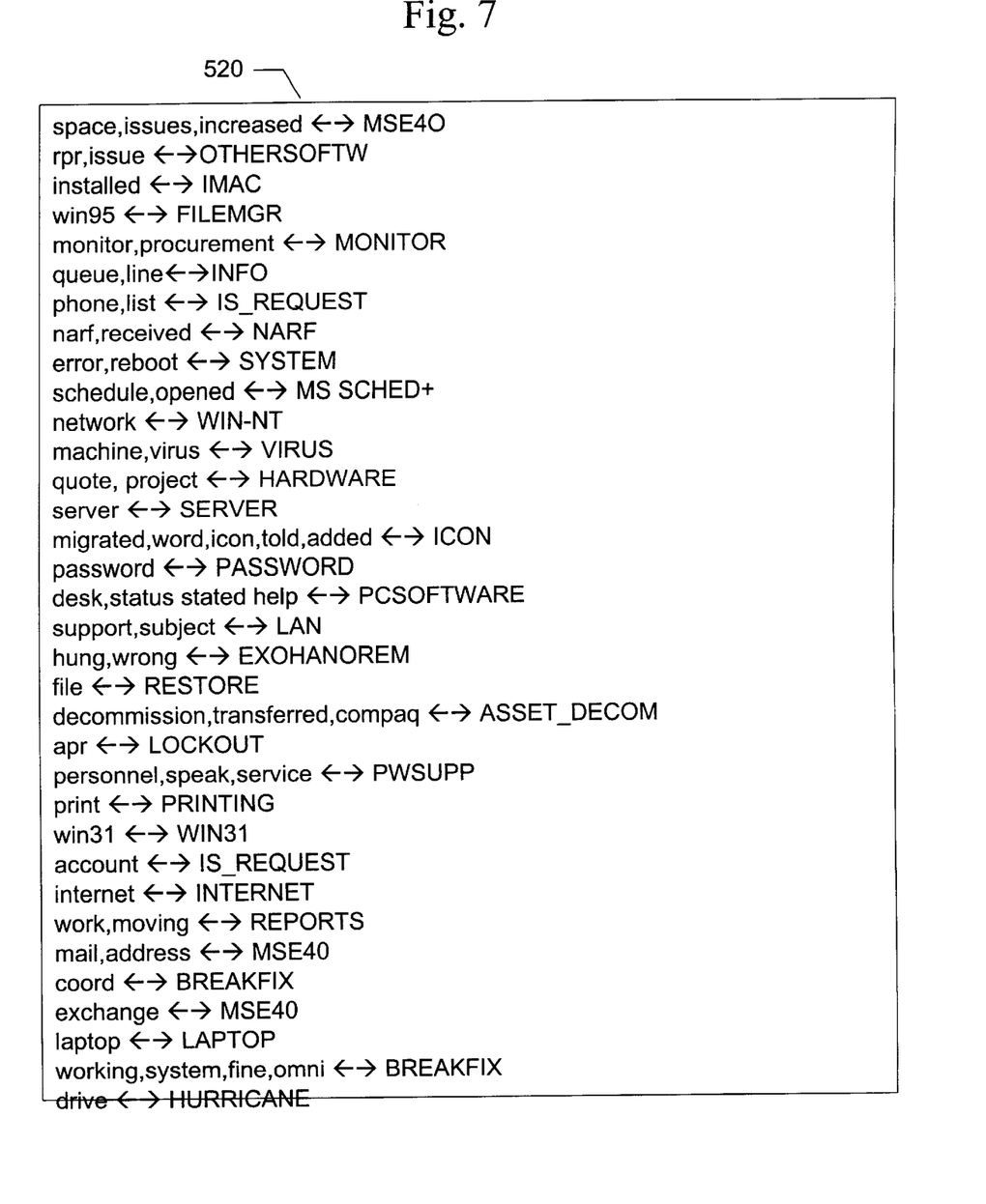
FIG. 7 is an exemplary format of a similarity table generated according to present invention.

In step 410, a similarity table 520, an example of which is shown in FIG. 7, is generated. Similarity table 520 shows the name of each class in the first classification followed by the name of the corresponding nearest class in the second classification.

Figure 8:
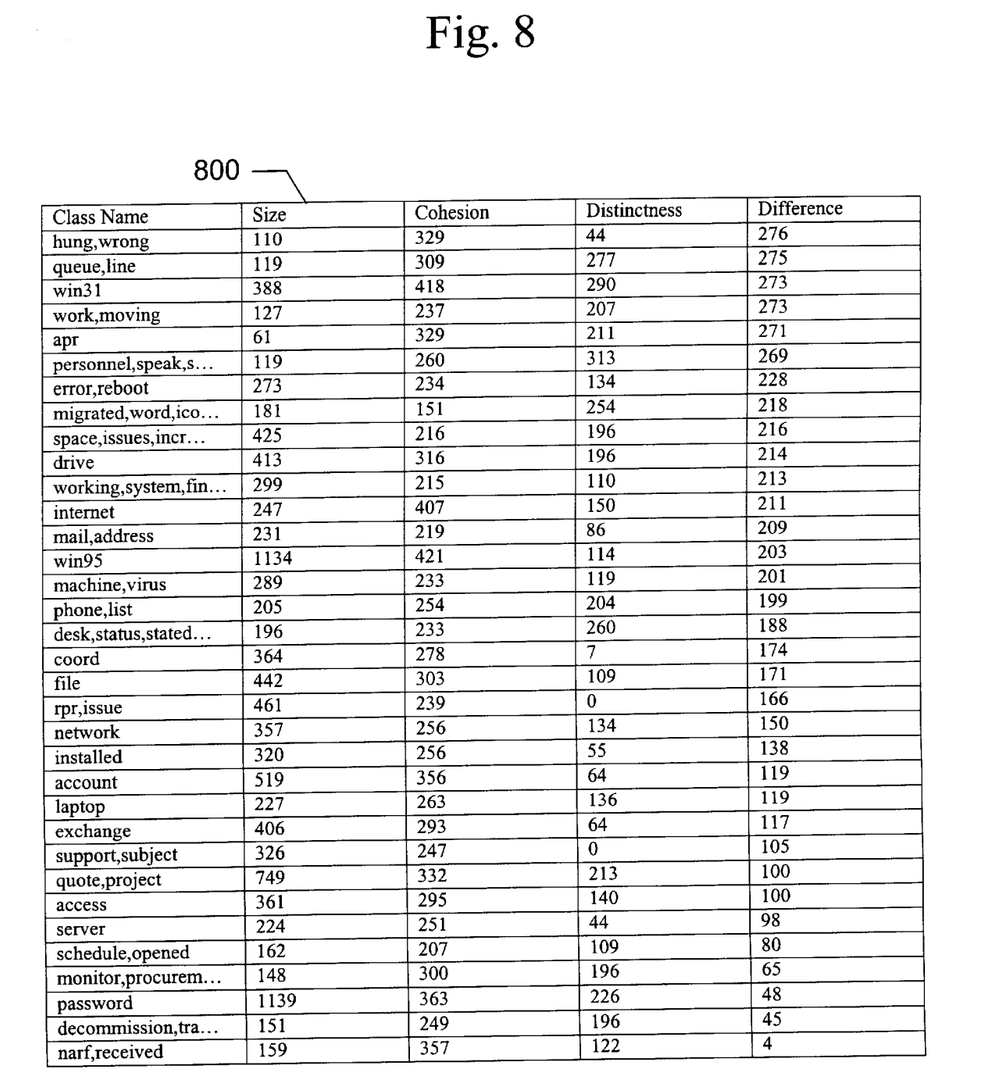
FIG. 8 is an exemplary format of a similarity table sorted by similarity, according to present invention.

In step 412, similarity table 520 is sorted by the names in the first classification based on the size of their distance from the nearest centroid in the second classification. Although typically the similarity table 520 is sorted based on a decreasing distance, an increasing distance or a more complex technique may be used as well. A resulting table 800, an example of which is shown in FIG. 8. Table 800 displays the distance from the nearest centroid in the second classification for every class in the first classification. Preferably table 800 is input to a spreadsheet program, which allows the table to be displayed to a user and sorted with the click of a button on the column header. This allows the user to see quickly which classes are most unique with respect to the reference classification.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for automatic generation of a comparison list comprising the steps of:

generating a first dictionary including a subset of words contained in a first document set, the first document set including at least one document and having an associated first classification including at least one class, each class having a class name;

generating a second dictionary including a subset of words contained in a second document set, the second document set including at least one document and having an associated second classification including at least one class, each class having a class name;

generating a common dictionary including words that are common to both the first dictionary and the second dictionary;

generating a count of occurrences of each word in the common dictionary within each document in each document set;

generating a centroid of each class in the space of the common dictionary;

determining a nearest centroid in the second classification for each centroid in the first classification;

generating a list including class names of each class in the first classification and a class name of a corresponding nearest class in the second classification; and sorting the class names in the first classification based on a distance from a nearest centroid in the second classification.

2. The method of claim 1, wherein the count generating step comprises the step of:

generating a matrix having rows and columns, each column corresponding to a word in the common dictionary, each row corresponding to a document, and each entry representing a number of occurrences of the corresponding word in the corresponding document.

3. The method of claim 2, wherein the centroid generating step comprises the step of:

generating a vector having a plurality of entries, each entry corresponding to a word in the common dictionary and having a value equal to an average of the values of the entries in the matrix corresponding to the word in the common dictionary.

4. The method of claim 3, wherein the step of determining a nearest centroid in the second classification for each centroid in the first classification comprises the steps of:

for each centroid in the first classification:
determining a distance between the centroid in the first classification and each centroid in the second classification; and
selecting a centroid in the second classification having a least distance from the centroid in the first classification.

5. The method of claim 4, wherein the distance between centroids is determined using a distance function of:

$$d(X, Y) = -\frac{X \cdot Y}{\|X\| \cdot \|Y\|},$$

wherein X is the centroid in the first classification, Y is the centroid in the second classification, and d(X,Y) is the distance between the centroid in the first classification and centroid in the second classification.

6. A system for automatic generation of a comparison list comprising:
   means for generating a first dictionary including a subset of words contained in a first document set, the first document set including at least one document and having an associated first classification including at least one class, each class having a class name;
   means for generating a second dictionary including a subset of words contained in a second document set, the second document set including at least one document and having an associated second classification including at least one class, each class having a class name;
   means for generating a common dictionary including words that are common to both the first dictionary and the second dictionary;
   means for generating a count of occurrences of each word in the common dictionary within each document in each document set;
   means for generating a centroid of each class in the space of the common dictionary;
   means for determining a nearest centroid in the second classification for each centroid in the first classification;
   means for generating a list including class names of each class in the first classification and a class name of a corresponding nearest class in the second classification; and
   means for sorting the class names in the first classification based on a distance from a nearest centroid in the second classification.

7. The system of claim 6, wherein the count generating means comprises:
   means for generating a matrix having rows and columns, each column corresponding to a word in the common dictionary, each row corresponding to a document, and each entry representing a number of occurrences of the corresponding word in the corresponding document.

8. The system of claim 7, wherein the centroid generating means comprises:
   means for generating a vector having a plurality of entries, each entry corresponding to a word in the common dictionary and having a value equal to an average of the values of the entries in the matrix corresponding to the word in the common dictionary.

9. The system of claim 8, wherein the means for determining a nearest centroid in the second classification for each centroid in the first classification comprises:
   means for, for each centroid in the first classification:
      determining a distance between the centroid in the first classification and each centroid in the second classification; and
      selecting a centroid in the second classification having a least distance from the centroid in the first classification.

10. The system of claim 9, wherein the distance between centroids is determined using a distance function of:

$$d(X, Y) = -\frac{X \cdot Y}{\|X\| \cdot \|Y\|},$$

wherein X is the centroid in the first classification, Y is the centroid in the second classification, and d(X,Y) is the distance between the centroid in the first classification and centroid in the second classification.

11. A computer program product for automatic generation of a comparison list, comprising:
   a computer readable medium;
   computer program instructions, recorded on the computer readable medium, executable by a processor, for performing the steps of:
      generating a first dictionary including a subset of words contained in a first document set, the first document set including at least one document and having an associated first classification including at least one class, each class having a class name;
      generating a second dictionary including a subset of words contained in a second document set, the second document set including at least one document and having an associated second classification including at least one class, each class having a class name;
      generating a common dictionary including words that are common to both the first dictionary and the second dictionary;
      generating a count of occurrences of each word in the common dictionary within each document in each document set;
      generating a centroid of each class in the space of the common dictionary;
      determining a nearest centroid in the second classification for each centroid in the first classification;
      generating a list including class names of each class in the first classification and a class name of a corresponding nearest class in the second classification; and
      sorting the class names in the first classification based on a distance from a nearest centroid in the second classification.

12. The computer program product of claim 11, wherein the computer program instructions for performing the count generating step comprise computer program instructions for performing the step of:
   generating a matrix having rows and columns, each column corresponding to a word in the common dictionary, each row corresponding to a document, and each entry representing a number of occurrences of the corresponding word in the corresponding document.

13. The computer program product of claim 12, wherein the computer program instructions for performing the centroid generating step comprise computer program instructions for performing the step of:
   generating a vector having a plurality of entries, each entry corresponding to a word in the common dictionary and having a value equal to an average of the values of the entries in the matrix corresponding to the word in the common dictionary.

14. The computer program product of claim 13, wherein the computer program instructions for performing step of determining a nearest centroid in the second classification for each centroid in the first classification comprise computer program instructions for performing the step of:
   for each centroid in the first classification:

determining a distance between the centroid in the first classification and each centroid in the second classification; and selecting a centroid in the second classification having a least distance from the centroid in the first classification.

15. The computer program product of claim 14, wherein the distance between centroids is determined using a distance function of:

$$d(X, Y) = -\frac{X \cdot Y}{\|X\| \cdot \|Y\|},$$

wherein X is the centroid in the first classification, Y is the centroid in the second classification, and d(X,Y) is the distance between the centroid in the first classification and centroid in the second classification.

* * * * *